(12) United States Patent
Ghorpade et al.

(10) Patent No.: US 7,396,551 B2
(45) Date of Patent: Jul. 8, 2008

(54) ALKALI AND ALKALINE EARTH METAL LEVULINATES AS ANTIMICROBIAL AGENTS

(75) Inventors: Viswas M. Ghorpade, Lawrence, KS (US); Mihir Narendra Vasavada, Logan, UT (US); Daren Cornforth, Providence, UT (US); Charles Carpenter, Wellsville, UT (US)

(73) Assignee: Corn-Chem International, Lawrence, KS (US)

( * ) Notice: Subject to any disclaimer, the term of this patent is extended or adjusted under 35 U.S.C. 154(b) by 510 days.

(21) Appl. No.: 10/834,685

(22) Filed: Apr. 29, 2004

(65) Prior Publication Data

US 2005/0244555 A1    Nov. 3, 2005

(51) Int. Cl.
*A23L 3/34*    (2006.01)
(52) U.S. Cl. .................... 426/321; 426/331; 426/332; 426/334; 426/532
(58) Field of Classification Search .............. 426/321, 426/331, 332, 334, 532
See application file for complete search history.

(56) References Cited

U.S. PATENT DOCUMENTS

| | | | | | |
|---|---|---|---|---|---|
| 2,383,907 | A | * | 8/1945 | Beechem et al. | 426/331 |
| 2,860,993 | A | * | 11/1958 | Maher | 426/265 |
| 3,743,519 | A | * | 7/1973 | Haas | 514/557 |

OTHER PUBLICATIONS

Vasavada, Carpenter, Cornforth and Ghorpade, "Sodium Levulinate and Sodium Lactate Effects on Microbial Growth and Stability of Fresh Pork and Turkey Sausages", Journal of Muscle Foods, May 2003, vol. 14, pp. 119-129.

* cited by examiner

*Primary Examiner*—Helen F Pratt
(74) *Attorney, Agent, or Firm*—Hovey Williams LLP

(57)    ABSTRACT

Improved methods are provided for the treatment of foods to inhibit microbial growth therein, by the applying to or incorporating into the food a quantity of an alkali or alkaline earth metal salt of levulinic acid. The salts may be topically applied by spraying or dipping, or can be incorporated into the foods such as comminuted meat products. Preferred antimicrobial agents are the sodium and potassium salts of levulinic acid, applied or incorporated at a level of from about 0.5-4% by weight. A variety of foods may be treated in accordance with the invention, such as human foods (e.g., meats and cheeses) or animal foods (pet foods).

14 Claims, 2 Drawing Sheets

$LOG_{10}$ AEROBIC PLATE COUNT FOR FRESH PORK SAUSAGE DURING STORAGE AT 2C
Data points at a given day not sharing the same letter are different ($P < 0.05$).
Fishers least significant difference was 0.59.

FIG. 1. LOG$_{10}$ AEROBIC PLATE COUNT FOR FRESH PORK SAUSAGE DURING STORAGE AT 2C

Data points at a given day not sharing the same letter are different ($P < 0.05$).
Fishers least significant difference was 0.59.

FIG. 2. LOG$_{10}$ AEROBIC PLATE COUNT FOR FRESH TURKEY SAUSAGE DURING STORAGE AT 2C

Data points at a given day not sharing the same letter are different ($P < 0.05$).
Fishers least significant difference was 0.48.

ALKALI AND ALKALINE EARTH METAL LEVULINATES AS ANTIMICROBIAL AGENTS

BACKGROUND OF THE INVENTION

1. Field of the Invention

The present invention is broadly concerned with improved methods for the treatment of foods such as meats and cheeses to inhibit microbial growth, as well as the food products themselves. More particularly, the invention is concerned with treatment of foods with a minor amount of an alkali or alkaline earth metal salt in liquid or solid form for antimicrobial purposes.

2. Description of the Prior Art

The growth and proliferation of many types of microbes can materially affect the quality of food products. It has been known in the past to treat meat products with steam, hot water wash, acid wash and addition of antimicrobial substances such as sodium lactate, sodium acetate, sodium diacetate, and nisin. Lactates are commonly added to processed meats because their antimicrobial activity increases shelf-life. Lactates used at a level of 1.5-3% of meat weight has been used extensively in the industry as an antimicrobial additive and to improve various quality attributes of meat. Lactates tend to positively affect flavor, microbial shelf-life and safety of pork.

Levulinic acid (4-oxopentanoic acid, $C_5H_8O_3$) is a 5-carbon organic acid commercially available as a biproduct of corn extrusion. Levulinic acid is known to have prooxidative activity that could limit shelf-life (Yi et al. "Antioxidant Activity of Maltol, Kojack Acid, Levulinic Acid, Furfural, 5-hydroxymethyl furfural, and Pyrazine." *Kor. J. Food Sci.* 14, 265-270 (1982)).

Various methods have been devised in the past for the production of levulinic acid. For example, U.S. Pat. No. 5,859,263 describes an efficient method for the production of levulinic acid via reactive extrusion.

Conversion of levulinic acid to the corresponding salts is generally quite straight forward, involving neutralization with appropriate cations and proper maintenance of pH to assure that the salt form predominates.

SUMMARY OF THE INVENTION

The present invention is directed to new methods for treatment of foods to inhibit microbial growth by applying to or incorporating into food a quantity of an alkali or alkaline metal salt of levulinic acid. A wide variety of foods (for human or animal, e.g., pets, consumption) may be treated in accordance with the invention, but the most preferred foods are meats (either comminuted or whole muscle) and cheeses. The levulinic salt may be applied by spraying or dipping in the case of whole muscle meats or cheeses, when use is made of a liquid salt dispersion or solution. Alternately, and especially in the case of comminuted food products, the salt in dried form may be incorporated into the foods by thorough mixing. In such cases the native moisture of the food serves to ensure dissilution and even application of the salt.

The levulinic salts of the invention may be applied or incorporated at a level of from about 0.5-4% by weight, based upon the weight of the food taken as 100% by weight. More preferably, the level of use if from about 1-3% by weight, particularly in the case of meat products. Various salts may be used, but for reasons of cost and availability the sodium, potassium and calcium salts of levulinic acid are preferred.

The levulinic salt-supplemented food products of the invention exhibit significantly enhanced microbial properties, compared with untreated foods or those treated with conventional antimicrobial agents such as sodium lactate. In actual tested food systems, levulinic acid was found not to exhibit prooxidant activity, since TBA values were low for such samples.

DETAILED DESCRIPTION OF THE PREFERRED EMBODIMENT

Figure 1:
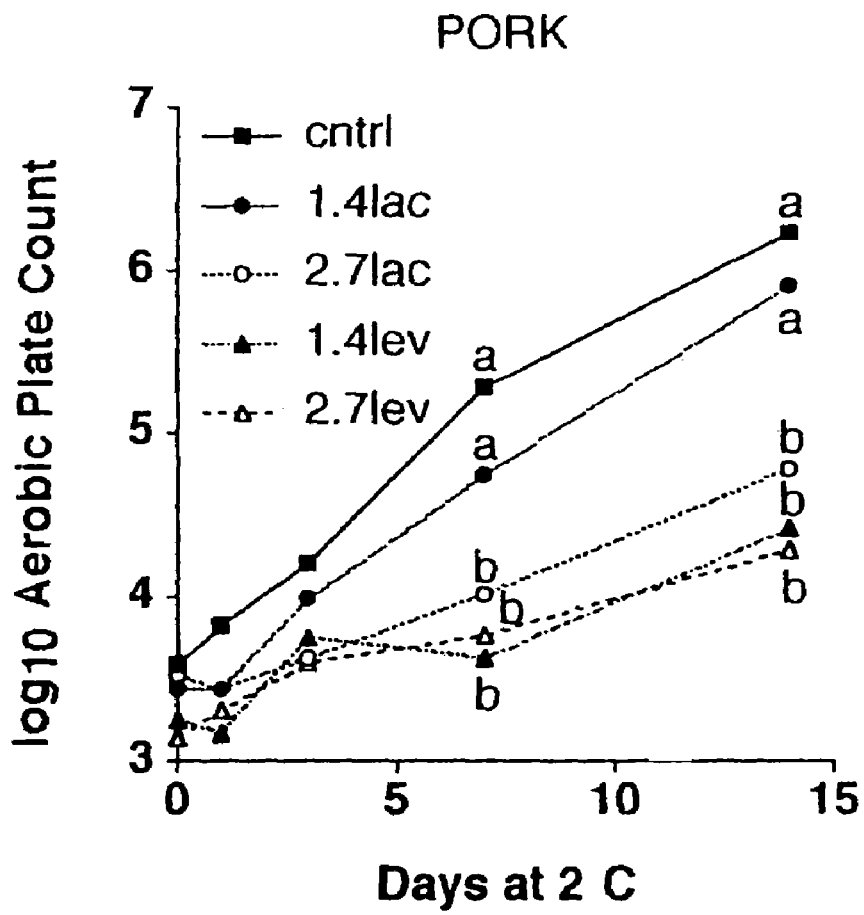
FIG. 1 is a comparative graph of aerobic plate count versus time for fresh pork sausage samples treated with sodium levulinate and sodium lactate, respectively.

The following example sets forth a study of the comparative antimicrobial properties of sodium levulinate versus sodium lactate with fresh pork and turkey sausages.

MATERIALS AND METHODS

Apparatus

The equipment used in this study included: Hobart grinder model 4152 (Hobart Mfg. Co., Troy, Ohio); Miniscan XE Plus portable colorimeter Model 45/O-S (Hunter Associates Laboratory Inc., Reston, Va.); Pressure cooker (16 L capacity; Mirromatic, Mirro Corp., Manitowoc, Wis.); pH meter (Fisher Accumet, model 610A, Houston, Tex.), pH meter electrode (Coming G-P combo electrode, Corning, N.Y.); Wrapping and sealing equipment (Heat Sealing Manufacturing Co., Cleveland, Ohio).

Experimental Design and Statistics

Water or syrups (15% and 30% w/w) of sodium lactate and sodium levulinate were added to fresh pork sausage at 10% of the meat weight. The sausage mix was divided into 5 portions, then placed on styrofoam trays, over-wrapped with PVC film and stored at 2 C. A single package from each treatment was removed at days 0, 1, 3, 7 and 14 and color, aerobic plate count, pH and TBA values were monitored, and fat content was measured on the 0 day samples. The experiment was replicated 3 times for both pork and turkey sausage.

The data were analyzed using STATISTICA (Statsoft Inc., Tulsa, Okla.) software. The effect of replication was blocked in order to avoid the variations due to the different meat batches used for each replicate.

Data were analyzed by MANOVA as a complete factorial (2*2+1) in a split plot model. The whole plot factors were salt type (levulinic or lactic), level of salt in sausage (1.4 or 2.7%), or water control. Whole plot factors had n=3 reflecting independent observations from three separate batches of sausage. Storage time in days was the subplot factor. To compare means, LSD value was calculated when $P<0.05$.

Preparation of Sodium Lactate and Sodium Levulinate

A 30% sodium lactate solution (pH 5.9-6.0) was prepared using a 60% sodium lactate solution (Sigma Chemicals, DL-Lactic acid sodium salt, 60% (w/w) syrup) and diluting it 1:1 with distilled water. Sodium levulinate solution was prepared by adding 20% NaOH to a 98+% levulinic acid solution (Sigma Chemicals, St. Louis, Mo.) to obtain a pH of 6.59. Because the pKa of levulinic acid is 4.59, the 2-pH unit difference due to titration with NaOH ensures that 99% of the levulinic acid was in the form of its sodium salt. The resulting levulinate was diluted with sufficient distilled water to produce a 30% solution with a pH of 6.6-6.7. The 30% solutions of sodium lactate and sodium levulinate were diluted 1:1 with distilled water to produce 15% solutions. These solutions were then added to the meat samples at the rate to 10% w/w of meat weight.

Sample Preparations

Approximately 6 kg of fresh pork lean trim or 6 kg fresh turkey breast meat were coarsely ground once through a grinder plate with 0.64 cm diameter pore size (Hobart Mfg. Co., Troy, Ohio). Premixed spices (Heller JD's country pork sausage seasoning GD-5076, Modesto, Calif.) were added to the sausage at the rate of 0.02 kg per kg meat and the meat mixture was passaged again through the coarse grinder plate. After adding the premixed spices, sausages contained 1.2% salt (no phosphate). The mixture was divided into 5 portions of 1 kg and each portion was mixed with either 10% water (control), 15% lactate, 30% lactate, 15% levulinate or 30% levulinate solutions. The coarsely ground mixtures were passed through the fine grinder plate (0.32 cm diameter pore size). Each mixture was further divided into 5 samples of 200 g each, packaged on a styrofoam tray and tightly overwrapped with an oxygen-permeable polyvinyl chloride film (SWM select wrap, Anchor Packaging, Marmaduke, Ark.) and stored in the USU meat laboratory product cooler for 0, 1, 3, 7 and 14 days at 2 C.

Color Measurement

Color was measured on day 0, 1, 3, 7 and 14 using Miniscan XE Plus portable colorimeter Model 45/O-S (Hunter Associates Laboratory, Reston, Va.). The illuminant setting was D65, with 10° standard observer angle. The instrument was standardized using a white and black standard plate. The sample L8, a* and b* values were then determined, and hue angle=$\tan^{-1}$(b*/a*) was calculated. Larger hug-angle values are associated with less red color (Van Laack et al. 1996), where hue-angle 0=red and hue-angle 90=yellow. The saturation index, corresponding to color intensity was also calculated $(a^{*2}+b^{*2})^{1/2}$.

Aerobic Plate Count

Aerobic plate counts of meat samples were determined by placing 10 g samples into 90 mL of 0.1% sterile bacto-peptone solution (Difco, Detroit, Mich.). Serial dilutions were pour plated following standard procedures (Messer et al. 1978). Standard plate count agar (Difco, Detroit, Mich.) was used as growth media. Pork samples were incubated at 37 C. for 48 h. Turkey samples were incubated for 60 h at 37 C. to obtain larger colonies that could be distinguished from meat particles at $10^{-1}$ dilution.

TBA Values

Thiobarbituric acid-reactive substances (TBARS) were determined as described by Buege and Aust (1978). Duplicate samples (0.5 g) for each treatment were mixed with 2.5 mL stock solution containing 0.375% TBA (Sigma Chemical Co., St. Louis, Mo.), 15% trichloroacetic acid (Mallinckrodt Baker, Paris, Ky.), and 0.25 N HCl. Samples were then heated for 10 min in a boiling water bath (100 C) to develop pink color, cooled under tap water, and centrifuged (Sorvall Instruments, Model RC 5C, Dupont, Wilmington, Del.) at 12,465×g for 10 min (rather than 1000×g as specified by Beuge and Aust 1978), to reduce sample turbidity. Absorbance was determined at 532 nm (Spectronic 21D, Milton Roy, Rochester, N.Y.) against a blank containing all reagents other than meat. The malonaldehyde (MDA) concentration was calculated using an extinction coefficient of $1.56\times10^{5-1}$ cm$^{-1}$ (Sinnhuber and Yu 1958). MDA concentration was converted to TBA number (mg MDA/kg meat sample) as follows:

(1) TBA number (mg/kg)=sample $A_{532}\times$(1M MDA/$1.56\times10^5$)×[(1 mole/L)/M]×(0.003 L/0.5 g meat)×(72.07 g MDA/mole MDA)×(1000 mg/g)×(1000 g/kg) or (2) TBA number (ppm)=sample $A_{532}\times2.77$ pH Values The pH values for each sample were determined by adding 90 mL deionized water to 10 g sample. The samples were then mixed with a glass rod and filtered through Whatman filter paper No. 2 (Fisher Scientific, Salt Lake city, Utah). The pH of the filtrate was determined using a pH meter calibrated at pH 4.0 and 7.0 (Fisher Chemicals, Fair Lawn, N.J.).

Fat Content

The fat content of the samples was determined using AOAC procedure 960.39 for solvent extraction of crude fat (AOAC 1990).

RESULTS

Microbial load of both pork and turkey sausages were significantly ($P<0.05$) affected by treatments, storage time and the interaction of treatment and storage time. By day 14 of storage of pork sausages, both control and sausages with 1.4% lactate had a high $\log_{10}$APC (6.23 and 5.90, respectively, FIG. 1). In comparison, pork sausage containing 2.7% sodium lactate, and both 1.4% and 2.7% sodium levulinate had significantly lower bacterial loads after 14 days storage with $\log_{10}$APC of 4.78, 4.42 and 4.29, respectively ($LSD_{0.05}=0.59$, FIG. 1). 1.4% sodium levulinate was a more effective antimicrobial agent than 1.4% sodium lactate in fresh pork sausage after 14 days storage with $\log_{10}$APC of 4.42 and 5.90, respectively ($LSD_{0.05}=0.59$, FIG. 1).

Figure 2:
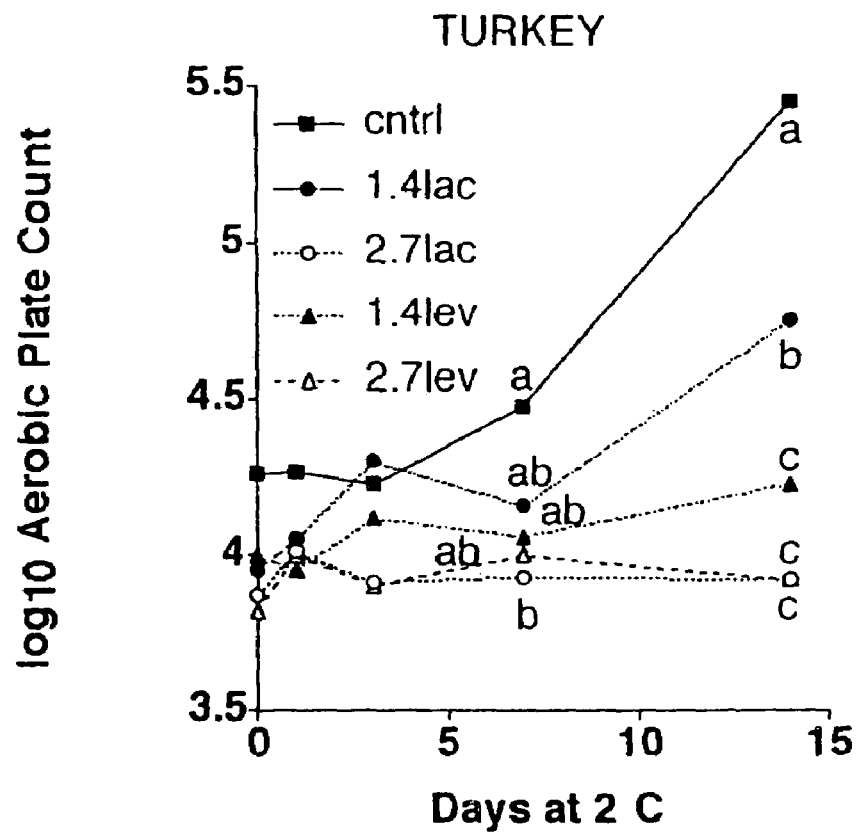
FIG. 2 is a comparative graph of aerobic plate count versus time for fresh turkey sausage samples treated with sodium levulinate and sodium lactate, respectively.

After 14 days of storage, the control turkey sausages had a mean $\log_{10}$APC of 5.45, which was significantly higher than all other treatments (FIG. 2). Turkey sausage containing 2.7% lactate, and both levels of levulinate, had lower APC after 14 days than those containing 1.4% lactate (FIG. 2). 1.4% sodium levulinate was as effective as 2.7% sodium levulinate for inhibition of aerobic microbial growth, as was the case for pork sausage.

TBA number of uncooked pork or turkey sausages was not affected by addition of sodium lactate or sodium levulinate. All TBA values for pork sausages were low ranging from 0.20 to 0.32 (Table 2). Most turkey sausage samples also had TBA values less than 0.5 (Table 2). TBA numbers of uncooked pork and turkey sausages decreased slightly, but significantly, during storage (Tables 1 and 2).

Storage time significantly affected Hunter color redness (a*), hue angle and saturation index of pork sausages (Table 1). Redness (a*) values decreased with storage time from 6.1 in day 0 controls to 4.9 after 14 days storage (Table 2). Hue angle of pork sausages increased form 65.8 to 69.7, indicating loss of redness during storage (Table 1).

Storage time significantly affected all Hunter color parameters of turkey sausages (Table 1). L*, a* and b* and saturation index values decreased with storage time, while the hue angle values increased indicating loss of redness during storage (Table 2). Lightness (L*) values were significantly affected by treatment (Table 1). Samples treated with 2.7% sodium levulinate had significantly higher L* values at day 0 than control treatment (L*=44.3 and 41.3, respectively; $LSD_{0.05}=2.38$; data not shown in tabular form)

Sausage pH was slightly but significantly increased from 5.8 for controls to 5.9 with 2.7% levulinate in turkey sausages (data not shown). Both pork and turkey sausages were lean (13.6+0.9% and 3.6+0.6% fat, respectively). Sensory evaluation was not formally conducted. However, informal panels indicated no flavor changes associated with use of levulinate compared to controls.

TABLE 1

SUMMARY OF SIGNIFICANCE (P < 0.05) AS DETERMINED BY ANALYSIS OF VARIANCE (ANOVA)

| Meat Type | Effect | $\log_{10} APC^1$ | $TBA^1$ | $L^{*1}$ | $a^{*1}$ | $b^{*1}$ | Hue angle[1] | Saturation index[1] | pH |
|---|---|---|---|---|---|---|---|---|---|
| Pork | Treatment[2] | *[4] | NS[4] | NS | NS | NS | NS | NS | NS |
| | Storage time[3] | * | * | NS | * | NS | * | NS | NS |
| | Treatment * time | * | * | NS | NS | NS | NS | NS | NS |
| Turkey | Treatment | * | NS | * | NS | NS | NS | NS | * |
| | Storage time | * | * | * | * | * | * | * | * |
| | Treatment * time | * | NS | NS | NS | NS | NS | NS | NS |

[1] APC = $\log_{10}$ aerobic plate count/g sample, TBA = Thiobarbituric acid number, L* = lightness; a* = redness; b* = yellowness; Hue angle = $\tan^{-1}(b^*/a^*)$, where lower values indicate more redness; Saturation index = $(a^{*2} + b^{*2})^{1/2}$
[2] Treatments were control (water), 1.5% or 3.0% sodium lactate or sodium levulinate
[3] Storage times were 0, 1, 3, 7 and 14 days at 2 C.
[4] * = significant at P < 0.05; NS = not significant at P < 0.05.

TABLE 2

POOLED MEANS BY STORAGE TIME FOR TBA VALUES, pH, AND HUNTER COLOR PARAMETERS OF FRESH PORK AND TURKEY SAUSAGES (TREATMENT EFFECTS WERE POOLED)

| Meat type and storage time | $TBA^1$ | $L^{*1}$ | $a^{*1}$ | $b^{*1}$ | Hue angle[1] | Saturation index[1] | pH |
|---|---|---|---|---|---|---|---|
| Pork | | | | | | | |
| 0 (days) | 0.32 ± 0.14[2] | 46.6 ± 8.2 | 6.1 ± 0.6 | 13.6 ± 2.0 | 65.8 ± 2.2 | 14.9 ± 2.0 | 6.14 ± 0.15 |
| 1 | 0.32 ± 0.09 | 47.7 ± 11.6 | 6.6 ± 0.9 | 14.0 ± 2.6 | 64.6 ± 3.0 | 15.5 ± 2.6 | 6.14 ± 0.25 |
| 3 | 0.30 ± 0.11 | 46.6 ± 8.0 | 6.1 ± 0.5 | 13.7 ± 1.5 | 65.8 ± 2.8 | 15.0 ± 1.3 | 6.23 ± 0.10 |
| 7 | 0.24 ± 0.09 | 48.3 ± 8.6 | 5.6 ± 1.1 | 13.5 ± 1.9 | 67.5 ± 4.4 | 14.6 ± 1.9 | 6.19 ± 0.09 |
| 14 | 0.20 ± 0.09 | 47.6 ± 8.6 | 4.9 ± 1.3 | 13.2 ± 2.3 | 69.7 ± 4.7 | 14.1 ± 2.4 | 6.21 ± 0.10 |
| $LSD_{0.05}$ | 0.07 | NS | 0.67 | NS | 2.58 | NS | NS |
| Turkey | | | | | | | |
| 0 | 0.52 ± 0.17 | 42.8 ± 2.2 | 2.2 ± 0.2 | 10.6 ± 0.6 | 78.1 ± 0.9 | 10.8 ± 0.6 | 5.87 ± 0.06 |
| 1 | 0.65 ± 0.18 | 40.3 ± 1.5 | 2.2 ± 0.2 | 10.3 ± 0.7 | 77.8 ± 0.8 | 10.5 ± 0.7 | 5.88 ± 0.05 |
| 3 | 0.52 ± 0.13 | 39.4 ± 0.9 | 2.0 ± 0.1 | 9.9 ± 0.6 | 78.8 ± 0.7 | 10.1 ± 0.6 | 5.80 ± 0.09 |
| 7 | 0.43 ± 0.09 | 37.4 ± 1.4 | 2.0 ± 0.1 | 9.3 ± 0.8 | 77.3 ± 4.3 | 9.6 ± 0.8 | 5.83 ± 0.05 |
| 14 | 0.49 ± 0.09 | 36.9 ± 1.2 | 1.5 ± 0.4 | 8.8 ± 0.6 | 80.4 ± 2.1 | 9.0 ± 0.6 | 5.84 ± 0.06 |
| $LSD_{0.05}$ | 0.1 | 1.12 | 0.15 | 0.50 | 1.65 | 0.50 | 0.05 |

[1] TBA = Thiobarbituric acid number, L* = Lightness; a* = redness; b* = yellowness; Hue angle = $\tan^{-1}(b^*/a^*)$, where lower values indicate more redness; Saturation index = $(a^{*2} + b^{*2})^{1/2}$.
[2] Values were expressed as mean ± standard deviation for pooled treatment effects.
NS = not significant at P < 0.05.
$LSD_{0.05}$ = Fisher's least significance difference at P < 0.05.

This study demonstrated that 1.4% sodium levulinate was as effective an antimicrobial agent as 2.7% sodium lactate for both pork and turkey sausages. In both instances, no difference was found between 1.4% and 2.7% sodium levulinate on aerobic plate counts during storage. Thus, as to these products, there is no advantage by use of the higher level of sodium levulinate since the low level was quite effective. However, this was not the case with sodium lactate. The higher level (2.7%) of sodium lactate was more antimicrobial than the lower level (1.4%) for inhibition of bacterial growth in both pork and turkey sausages. This is in accordance with prior reports.

We claim:

1. A method of treating foods comprising the step of applying to or incorporating into food from about 1-3% by weight, based upon the weight of the food taken as 100% by weight, of an alkali or alkaline earth metal salt of levulinic acid as an anti-microbial growth agent, and maintaining the contact between said food and said agent for a period of days.

2. The method of claim 1, said food consisting from the group consisting of meat and cheese.

3. The method of claim 2, said meat being selected from the group consisting of comminuted or whole muscle meats.

4. The method of claim 3, said meat being uncooked.

5. The method of claim 4, said meat being sausage.

6. The method of claim 1, said salt being applied or incorporated as a liquid.

7. The method of claim 1, said salt being a sodium, potassium, or calcium salt.

8. A food produced in accordance with the method of claim 1.

9. The food of claim 8, said food consisting from the group consisting of meat and cheese.

10. The food of claim 9, said meat being selected from the group consisting of comminuted or whole muscle meats.

11. The food of claim 10, said meat being uncooked.

12. The food of claim 10, said meat being sausage.

13. The food of claim 8, said salt being applied or incorporate as a liquid.

14. The food of claim 13, said salt being a sodium, potassium, or calcium salt.

* * * * *